US 011952075B2

(12) United States Patent
Smith et al.

(10) Patent No.: US 11,952,075 B2
(45) Date of Patent: Apr. 9, 2024

(54) STARTING DEVICE FOR A MOTORCYCLE (71) Applicant: ED TUCKER DISTRIBUTOR, INC., Fort Worth, TX (US)

(72) Inventors: Bradley J. Smith, Lindale, TX (US); Paul Perebijnos, Wildomar, CA (US); Scott Boyer, Valencia, CA (US)

(73) Assignee: Turn 14 Distribution, Inc., Horsham, PA (US)

( * ) Notice: Subject to any disclaimer, the term of this patent is extended or adjusted under 35 U.S.C. 154(b) by 199 days.

(21) Appl. No.: 17/684,524

(22) Filed: Mar. 2, 2022

(65) Prior Publication Data

US 2022/0185423 A1 Jun. 16, 2022

Related U.S. Application Data (63) Continuation of application No. 16/243,456, filed on Jan. 9, 2019, now Pat. No. 11,286,016.

(51) Int. Cl.
*B62K 25/08* (2006.01)
*B62K 25/04* (2006.01)

(52) U.S. Cl.
CPC ........ *B62K 25/08* (2013.01); *B62K 2025/047* (2013.01); *B62K 2025/048* (2013.01)

(58) Field of Classification Search
CPC .............. B62K 25/08; B62K 2025/047; B62K 2025/048; B60G 2204/46; B60G 2300/12; B60G 17/005
See application file for complete search history.

(56) References Cited

U.S. PATENT DOCUMENTS

| 2,868,482 | A | | 1/1959 | Westcott, Jr. | |
|---|---|---|---|---|---|
| 3,989,261 | A | | 11/1976 | Kawaguchi | |
| 4,572,534 | A | * | 2/1986 | Heyl | B62L 1/00 |
| | | | | | 280/276 |
| 4,609,202 | A | | 9/1986 | Miyakoshi et al. | |
| 4,735,276 | A | * | 4/1988 | Burton | B62K 25/08 |
| | | | | | 180/219 |
| 4,884,842 | A | | 12/1989 | Finkelstein | |
| 5,022,501 | A | | 6/1991 | Hayashi et al. | |
| 5,044,592 | A | * | 9/1991 | Cienfuegos | B62K 19/36 |
| | | | | | 248/408 |
| 5,344,170 | A | | 9/1994 | Ochoa | |
| 5,509,674 | A | | 4/1996 | Browning | |
| 6,202,971 | B1 | | 3/2001 | Duncan | |
| 6,279,932 | B1 | | 8/2001 | White et al. | |
| 6,354,557 | B1 | | 3/2002 | Walsh | |
| 6,776,429 | B2 | * | 8/2004 | Chou | B62K 21/22 |
| | | | | | 280/287 |

(Continued)

FOREIGN PATENT DOCUMENTS

GB 2188676 A 10/1987

*Primary Examiner* — Kevin Hurley
*Assistant Examiner* — Marlon A Arce
(74) *Attorney, Agent, or Firm* — Barnes & Thornburg LLP (57) ABSTRACT According to an aspect of the disclosed embodiments, an apparatus for a vehicle includes a locking plate configured to be coupled to a first shaft of a suspension rod. A housing is configured to be coupled to a second shaft of the suspension rod that moves relative to the first shaft. The housing extends along a first longitudinal axis. A pin is configured to rotate about a second longitudinal axis. A locking mechanism is configured to lock the pin in starting position.

18 Claims, 11 Drawing Sheets (56) References Cited

U.S. PATENT DOCUMENTS

| | | |
|---|---|---|
| 7,051,852 B2 | 5/2006 | Maret |
| 8,727,081 B2 | 5/2014 | Phipps |
| 9,394,963 B2 | 7/2016 | Phipps |
| 10,088,008 B2 * | 10/2018 | Groebner ................ F16F 9/54 |
| 2006/0237273 A1 | 10/2006 | Maret |

* cited by examiner

STARTING DEVICE FOR A MOTORCYCLE

CROSS-REFERENCE TO RELATED APPLICATIONS

This application is a continuation of U.S. patent application Ser. No. 16/243,456, filed Jan. 9, 2019, now U.S. Pat. No. 11,286,016, which is expressly incorporated by reference herein.

TECHNICAL FIELD

The present application relates generally to motorcycles, and more particularly, to a starting device for a motorcycle.

BACKGROUND

Motorcycles generally include a suspension fork coupled to the front tire. The suspension fork includes an inner shaft and an outer telescopic shaft that is compressible along the inner shaft. The suspension fork enables the front tire to compress and extend as the motorcycle passes over objects in the road. The compression and extension provides comfort to the rider and may prevent the rider from being involved in an accident.

Motorcycles also experience a great amount of thrust when the motorcycle is started. The thrust may cause the motorcycle to rotate backward onto the back tire. Rotation of the motorcycle may be dangerous, and in some cases, may eject the rider from the motorcycle. By locking the suspension fork in a compressed position, rotation of the motorcycle may be prevented or limited. However, once the motorcycle is in movement, the suspension fork must be released so that the suspension fork can compress and extend normally during operation of the motorcycle.

SUMMARY

According to a first aspect of the disclosed embodiments, an apparatus for a vehicle includes a locking plate configured to be coupled to a first shaft of a suspension rod. A housing is configured to be coupled to a second shaft of the suspension rod that moves relative to the first shaft. The housing extends along a first longitudinal axis. A pin is configured to rotate about a second longitudinal axis. The pin is biased into an unlocked position. The pin is configured to engage the locking plate in a locked position. A locking mechanism is configured to lock the pin in starting position. When the pin is released from the starting position, the pin moves into the locked position.

In some embodiments of the first aspect, the locked position can be between the unlocked position and the starting position. In the unlocked position, a tip of the pin can be positioned in the housing. In the starting position, the tip of the pin can be positioned outside of the housing. The locking plate can include a first arm segment. A pair of second arm segments can be hingedly attached to the first arm segment. The pair of second arm segments can be secured together with a fastener to secure the locking plate to the first shaft of the suspension rod. The first longitudinal axis can be orthogonal to the second longitudinal axis.

Optionally, in the first embodiment, the pin can be moved from the unlocked position to the starting position by rotating the pin about the second longitudinal axis. The pin can be moved from the starting position to the locked position by applying a compressive force to the suspension rod. The compressive force can be applied along the first longitudinal axis. The pin can advance past the locking plate when the compressive force is applied. A lowered tapered surface of the pin can advance along an upper tapered surface of the locking plate as the pin advances past the locking plate. The pin can engage the locking plate when the compressive force is released. The pin can be rotated to the locked position when the pin engages the locking plate. The pin can disengage from the locking plate when an additional compressive force is applied to the suspension rod. The pin can retract to the starting position when the pin is disengaged from the locking plate.

In some embodiments of the first aspect, a guide tab of the pin can be locked in the locking mechanism when the pin is rotated to the starting position. The guide tab of the pin can be disengaged from the locking mechanism when the pin is engaged with the locking plate. In the unlocked position, the pin can be positioned at a first rotational angle relative to the second longitudinal axis. In the starting position, the pin can be positioned at a second rotational angle relative to the second longitudinal axis. The first rotational angle can be different than the second rotational angle. A notch of the pin can be secured with a notch of the locking plate in the locked position.

According to a second aspect of the disclosed embodiments, a method of locking a suspension rod include coupling a housing to a first shaft of a suspension rod. The method also includes rotating a pin in the housing from an unlocked position to a starting position. The method also includes applying a compressive force to the suspension rod to advance the pin downward past a locking plate coupled to a second shaft of the suspension rod. The method also includes releasing the compressive force to permit the pin to advance to engage the locking plate. The pin is rotated from the starting position to a locked position when the pin is engaged with the locking plate.

BRIEF DESCRIPTION

The detailed description particularly refers to the following figures, in which.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 1:
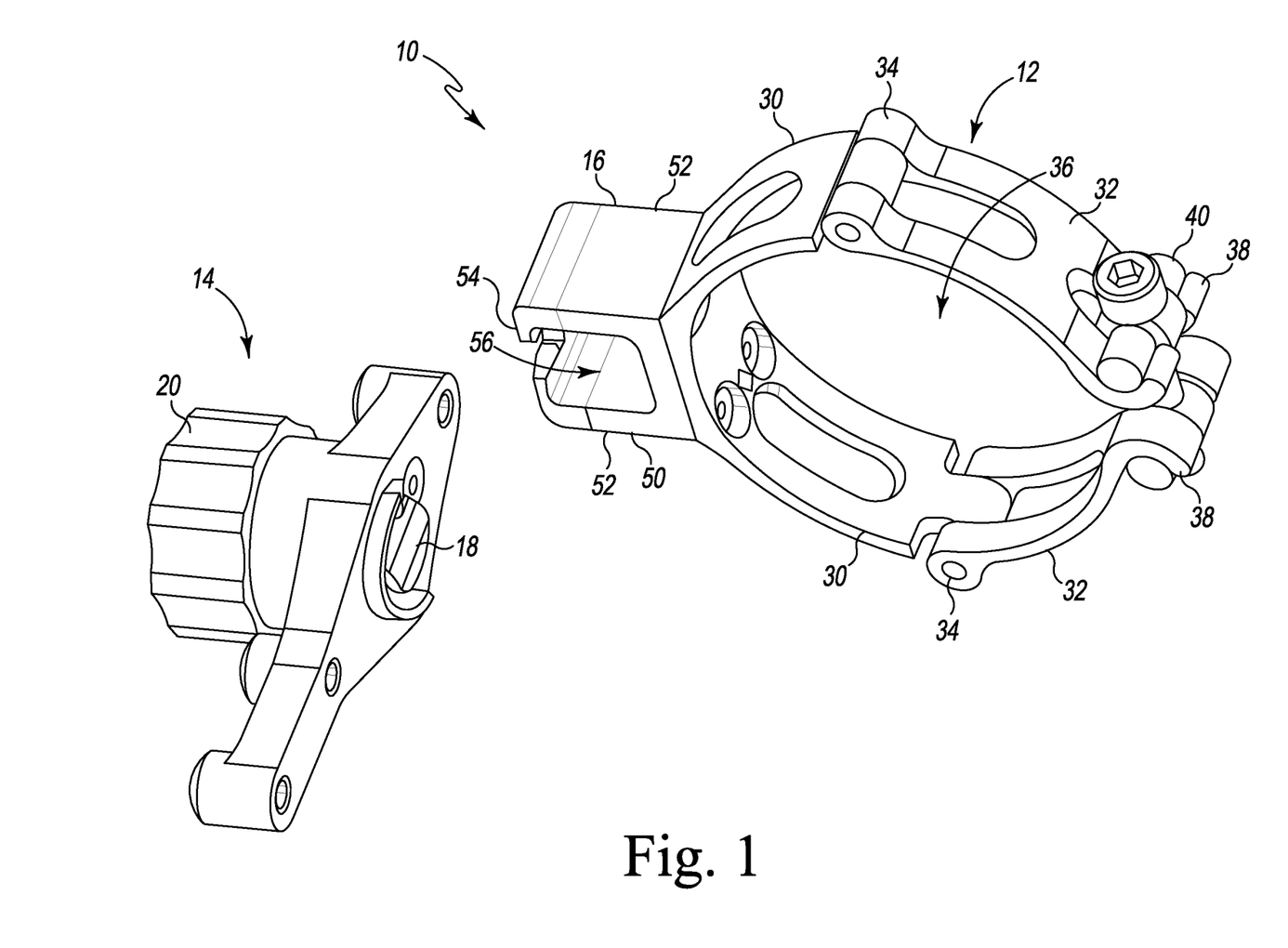
FIG. 1 is a side perspective view of an assembly for starting a motorcycle.

Referring to FIG. 1, a locking assembly 10 for a motorcycle (not shown) includes a first component 12 configured to be coupled to an inner shaft of a suspension fork and a second component 14 configured to be coupled to a telescopic outer shaft of a suspension fork. The first component 12 includes a locking plate 16 that is configured to be secured to a pin 18 of the second component 14. The pin 18 of the second component 14 is configured to be rotated from an unlocked position to a starting position by rotating a knob 20. With the pin 18 in the starting position, a compressive force is applied to the suspension fork so that the second component 14 is advanced past the first component 12 as the suspension fork compresses. When the force is removed from the suspension fork, the pin 18 engages the locking plate 16 and is rotated to a locked position. In the locked position, the pin 18 is secured to the locking plate 16 so that the suspension fork is retained in a compressed position. In this compressed position, the motorcycle is restrained from pulling upward upon starting the motorcycle. After the motorcycle is started, and upon an additional compression of the suspension fork, the pin 18 is released from the locking plate 16 and retracts back to the unlocked position so that the suspension fork returns to an uncompressed position.

The first component 12 includes a pair of arms 30 extending from the locking plate 16. The arms 30 are rounded to be secured around a cylindrical inner shaft of the suspension fork. Each of a second pair of arms 32 extends from an arm 30. The arms 32 and the arms 30 are coupled by a hinge 34 that allows the arms 32 to rotate with respect to the arms 30. The arms 32 are also rounded and sized and shaped to position around the inner shaft of the suspension fork. Because the arms 32 and the arms 30 are hingedly attached, an opening 36 defined by the arms 30, 32 is adjustable in size to accommodate different sized inner shafts. The arms 30 are positioned around the inner shaft, and the arms 32 are rotated inward until the arms 32 are flush with the inner shaft. An end 38 of each arm 32 is then secured with a fastener 40 that tightens the first component 12 around the inner shaft.

Figure 2:
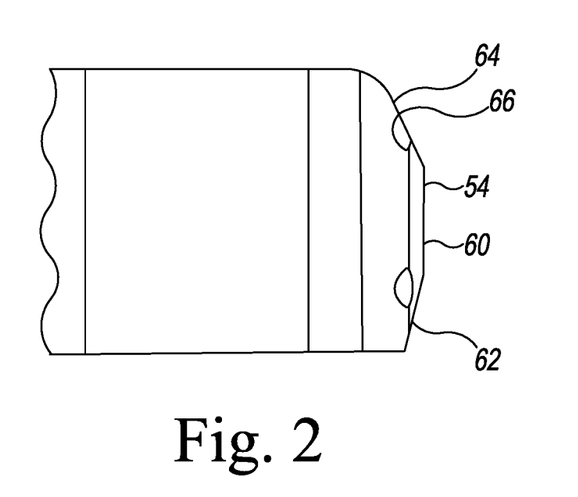
FIG. 2 is a front elevation view of the first component of the assembly shown in FIG. 1.

The locking plate 16 includes a body 50 having a pair of sides 52 extending outward from the arms 30. A front face 54 of the locking plate 16 extends between the sides 52 so that an opening 56 is defined between the sides 52 and the front face 54 and the arms 30. The opening 56 is sized to receive a portion of the pin 18. Referring to FIG. 2, the front face 54 includes a planar front surface 60. An angled lower surface 62 extends downward from the front surface 60. An angled upper surface 64 extends upward from the front surface 60. The angled upper surface 64 provides an engagement surface 66 for the pin 18 to advance past the first component 12 (as described in more detail below).

Figure 3:
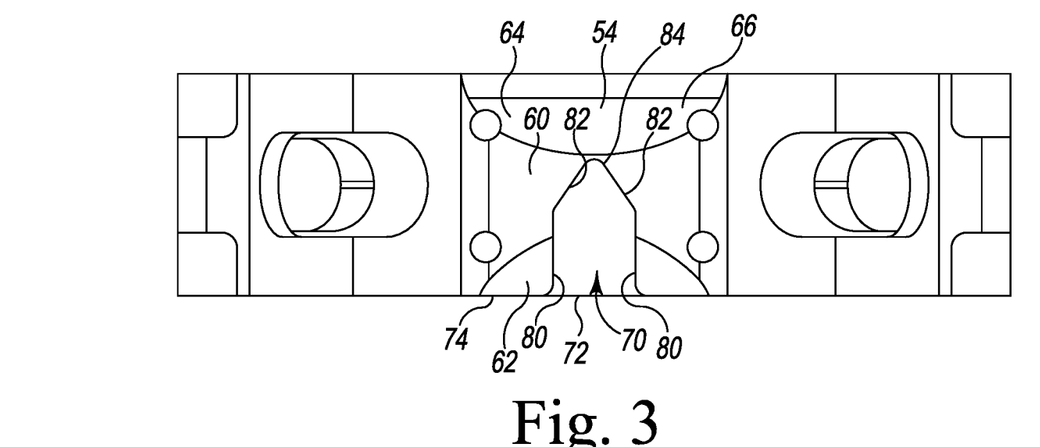
FIG. 3 is a side elevation view of the first component of the assembly shown in FIG. 1.

Referring now to FIG. 3, a notch 70 is formed in the front face 54 of the locking plate 16. The notch 70 extends from an opening 72 in a bottom 74 of the front face 54. The notch 70 also extends from an opening 76 in the front face 54 to the opening 56. The notch 70 extends through the lower surface 62 and partially through the front surface 60. The notch 70 is defined by a pair of opposite side walls 80 and a pair of angled end walls 82 extending from the side walls 80. The opposite side walls 80 are substantially parallel. The angled end walls 82 intersect at a rounded surface 84 so that the angled end walls 82 define a V-shape.

Figure 4:
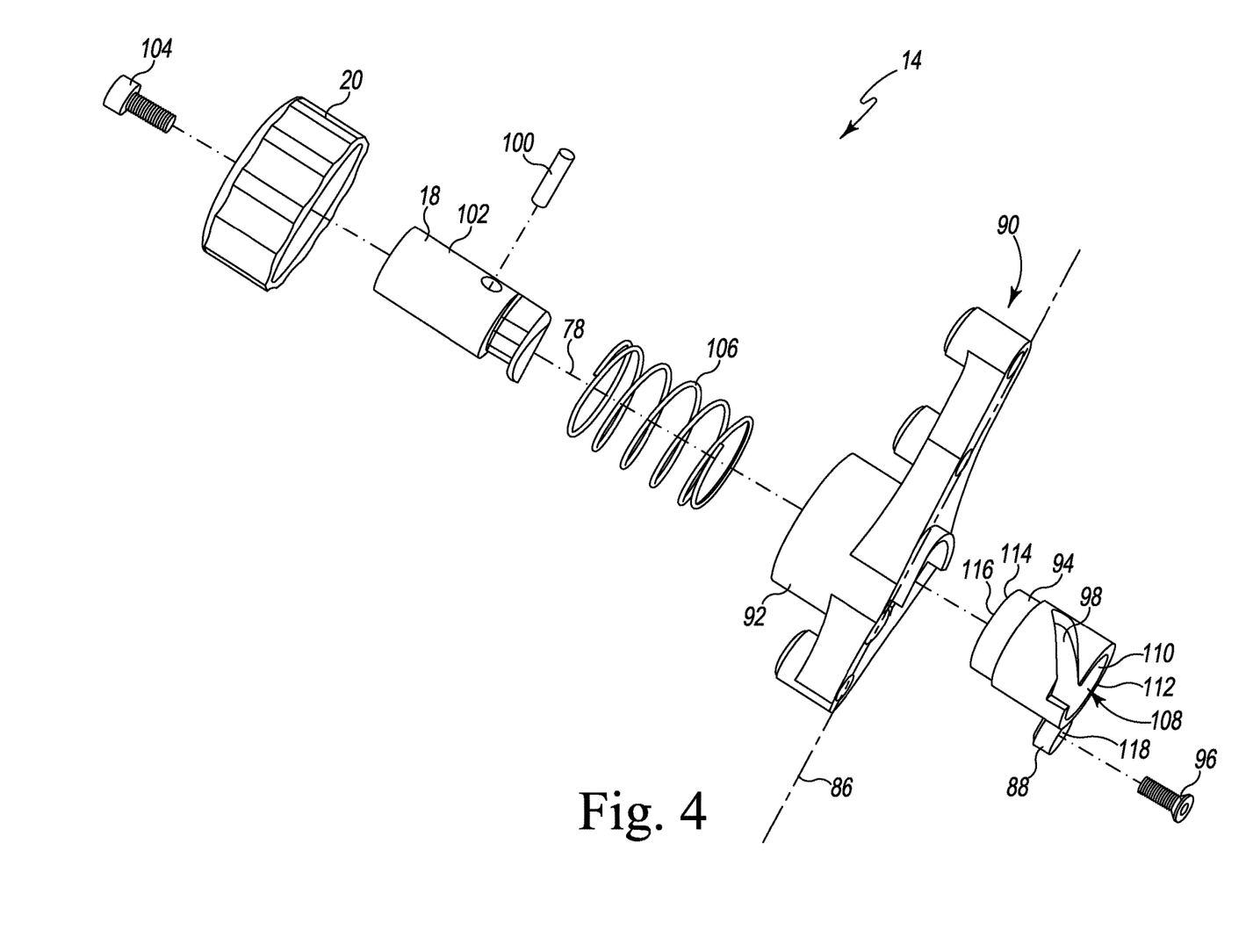
FIG. 4 is an exploded view of the second component of the assembly shown in FIG. 1.

Referring to FIG. 4, the second component 14 includes a housing 90 that is configured to be coupled to the telescopic outer shaft of a suspension fork. The housing 90 extends along a longitudinal axis 86 and includes a body 92 configured to receive a guide barrel 94. The guide barrel 94 is joined to the housing 90 with a fastener 96 that is inserted through an opening 118 in a flange 88 of the guide barrel 94. The guide barrel 94 includes a bore 108 extending from an opening 110 in a front end 112 to an opening 114 in a back end 116. The pin 18 is configured to be inserted into the bore 108 of the guide barrel 94 along a longitudinal axis 78 that extends traverse to the longitudinal axis 86. The pin 18 is configured to rotate about the longitudinal axis 78. The pin 18 is also configured to advance axially along the longitudinal axis 78. The guide barrel 94 includes a guide slot 98. The pin 18 includes a guide tab 100 extending radially outward from an outer surface 102 of the pin 18. The pin 18 is positioned within the guide barrel 94 so that the guide tab 100 of the pin 18 is positioned within the guide slot 98 of the guide barrel 94. The knob 20 is secured to the pin 18 with a fastener 104. A biasing element 106, illustrated as a spring, is positioned around the pin 18 and extends from the knob 20 to housing 90.

Figure 5:
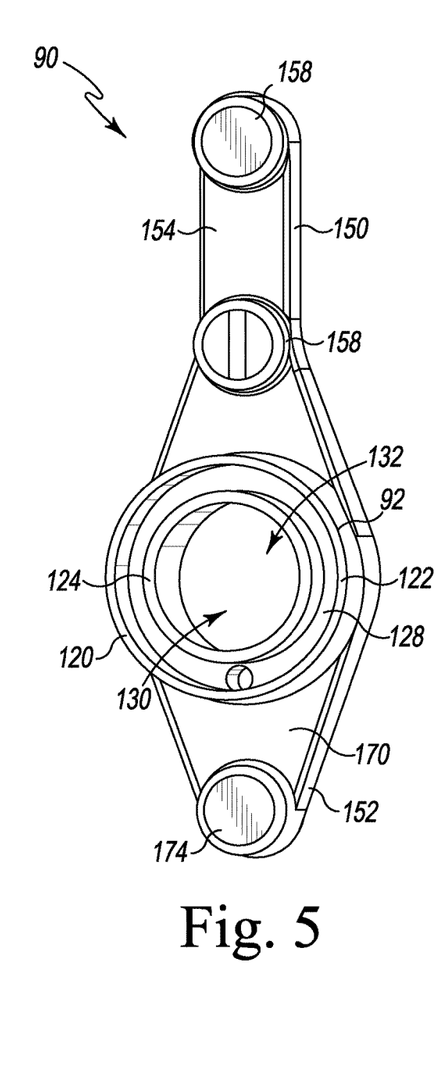
FIG. 5 is a rear perspective view of the housing of the second component shown in FIG. 4.
Figure 6:
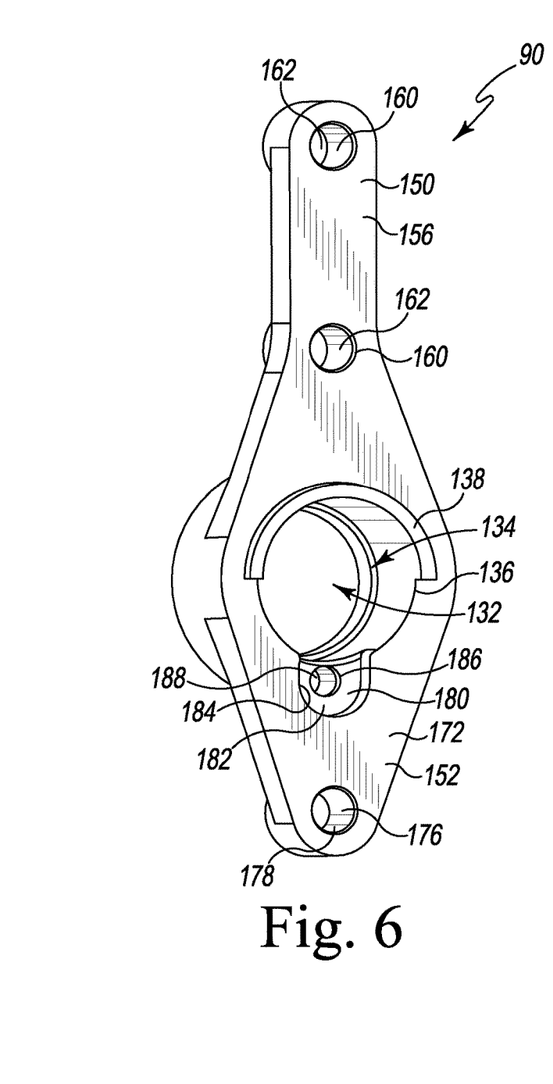
FIG. 6 is a front perspective view of the housing shown in FIG. 5.

Referring to FIGS. 5 and 6, the body 92 of the housing 90 is generally cylindrical. A rear face 120 of the body 92 includes a circular outer flange 122 and a circular inner flange 124 extending outward from a rear face 120 (shown in FIG. 5). A circular channel 128 is defined between the outer flange 122 and the inner flange 124. The channel 128 is configured to receive an end of the biasing element 106. An opening 130 is defined in the rear face 120. A bore 132 extends from the opening 130 to an opening 134 in a front face 136 of the body 92 (shown in FIG. 6). The bore 132 is sized to receive the guide barrel 94. A semi-circular flange 138 extends around the opening 134.

An upper flange 150 and a lower flange 152 extend from the body 92. The upper flange 150 includes a rear surface 154 (shown in FIG. 5) and a front surface 156 (shown in FIG. 6). A pair of attachment points 158 extends from the rear surface 154. Threaded passageways 160 extend from openings 162 in the front surface 156 and into the attachment points 158. The threaded passageways 160 are configured to receive a fastener (not shown) to secure the housing 90 to the telescopic outer shaft of a suspension fork. The lower flange 152 includes a rear surface 170 (shown in FIG. 5) and a front surface 172 (shown in FIG. 6). An attachment point 174 extends from the rear surface 170. A threaded passageway 176 extends from an opening 178 in the front surface 172 and into the attachment point 174. The threaded passageway 176 is configured to receive a fastener (not shown) to secure the housing 90 to the telescopic outer shaft of the suspension fork.

A notch 180 extends from the opening 134 through the front surface 172 of the lower flange 152. The notch 180 is defined by a bottom surface 182 and an inner wall 184 extending from the bottom surface 182 to the front surface 172. A threaded bore 186 extends from an opening 188 in the bottom surface 182. The threaded bore 186 is configured to receive the fastener 96 to secure the guide barrel 94 to the housing 90.

Figure 7:
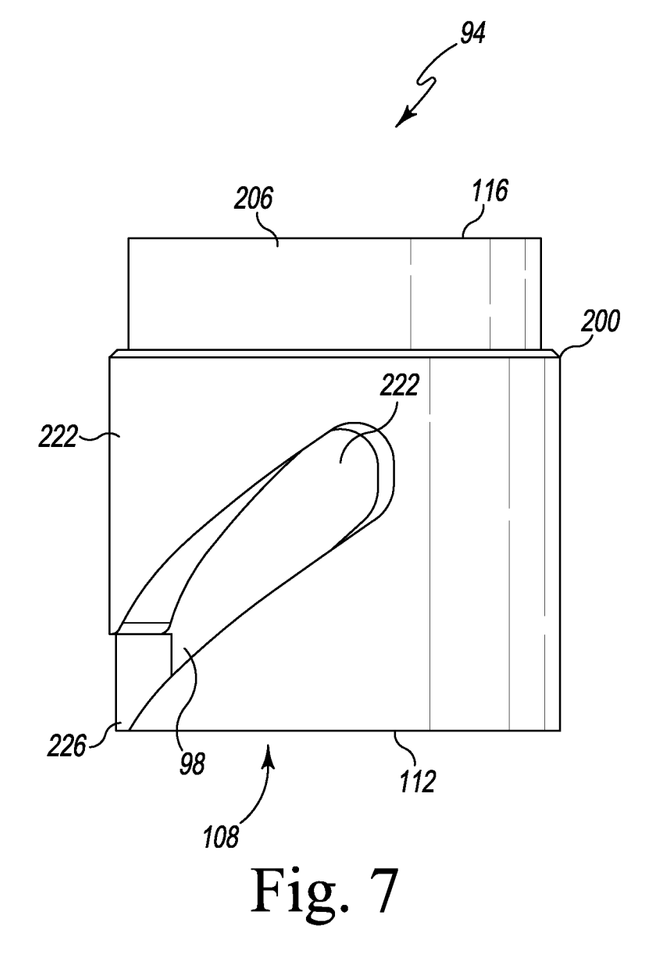
FIG. 7 is a top plan view of the guide barrel of the second component shown in FIG. 4.
Figure 8:
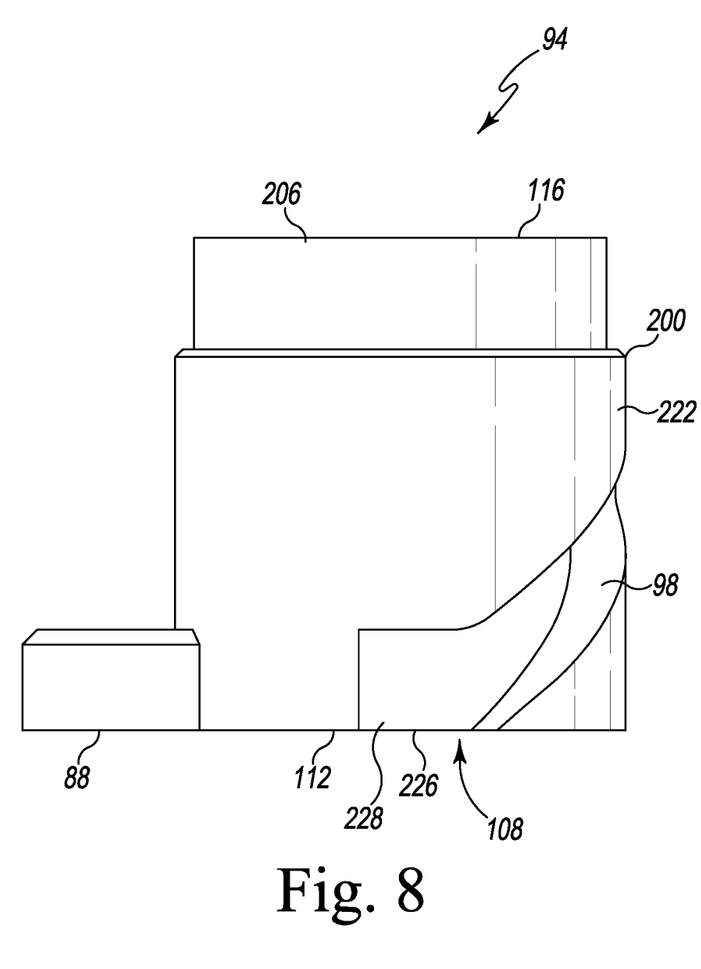
FIG. 8 is a side elevation view of the guide barrel shown in FIG. 7.

Referring to FIGS. 7 and 8, the guide barrel 94 includes a cylindrical body 200 that ends between the front end 112 and the back end 116. A cylindrical flange 206 extends from the front end 112. The cylindrical flange 206 has a diameter that is less than a diameter of the cylindrical body 200 so that the guide barrel 94 steps down from the cylindrical body 200 to the cylindrical flange 206. The flange 88 extends radially outward from the front end 112. The flange 88 is configured to position in the notch 180 of the housing 90.

The guide slot 98 extends through the cylindrical body 200 from an outer surface 222 of the cylindrical body 200 to the bore 108. The guide slot 98 is generally curved and spirals along the outer surface 222 of the cylindrical body 200 from a back end 224 to a front end 226 of the guide barrel 94. The front end 226 of the guide slot 98 includes a locking mechanism 228 that extends circumferentially around the guide barrel 94.

Figure 9:
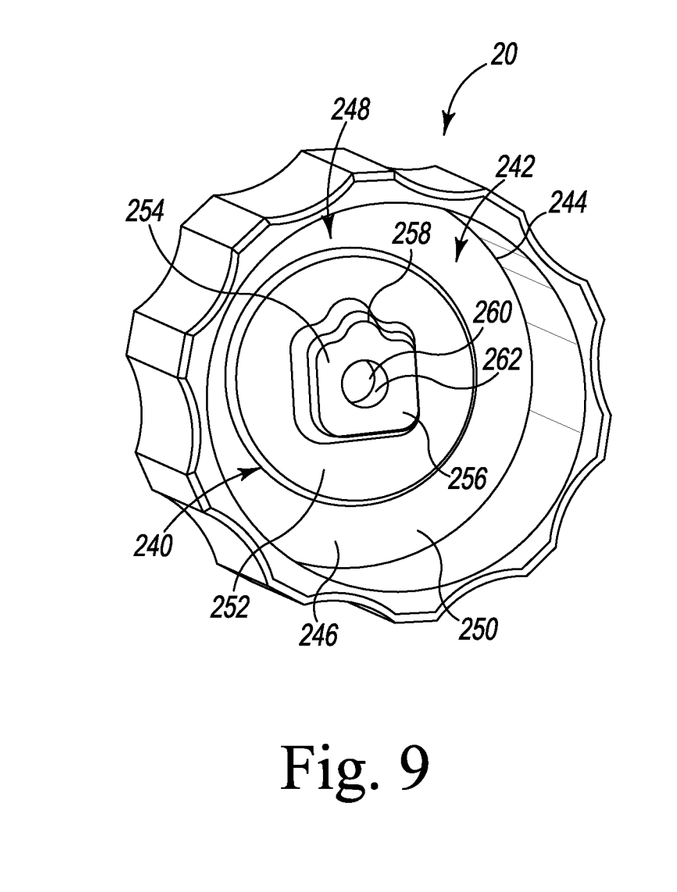
FIG. 9 is a front perspective view of the knob of the second component shown in FIG. 4.

Referring now to FIG. 9, a front side 240 of the knob 20 includes a cavity 242 extending from an opening 244. The cavity 242 is defined between a bottom surface 246 and a side wall 248 extending from the bottom surface 246. The bottom surface 246 includes a circumferential channel 250 that extends between the side wall 248 and a raised surface 252 extending from the bottom surface 246. Another raised surface 254 extends from the raised surface 252. The raised surface 254 includes a substantially square body 256 and a flange 258 extending radially outward from the body 256. A bore 260 extends through an opening 262 in the body 256 and is configured to receive the fastener 104.

Figure 10:
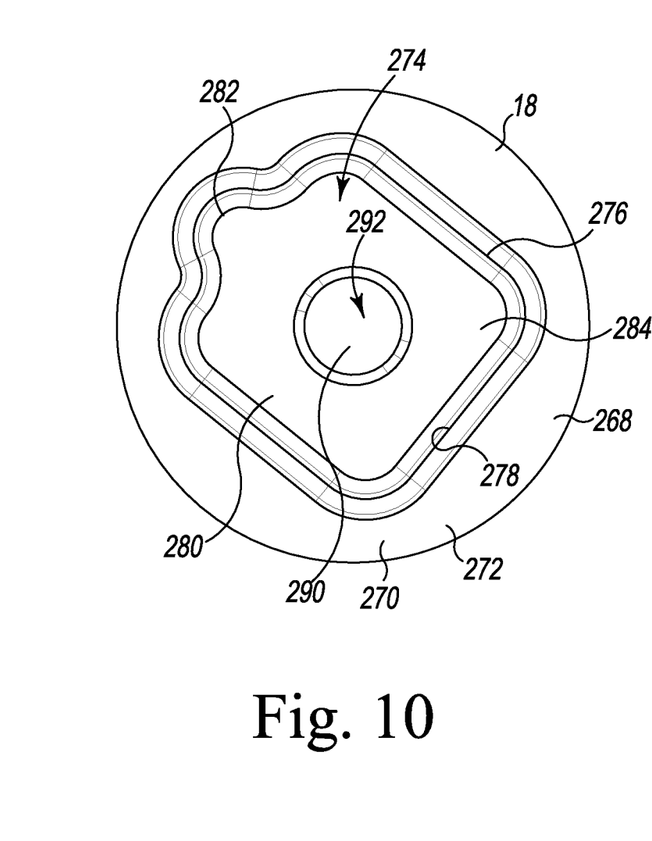
FIG. 10 is a rear perspective view of the pin of the second component shown in FIG. 4.
Figure 11:
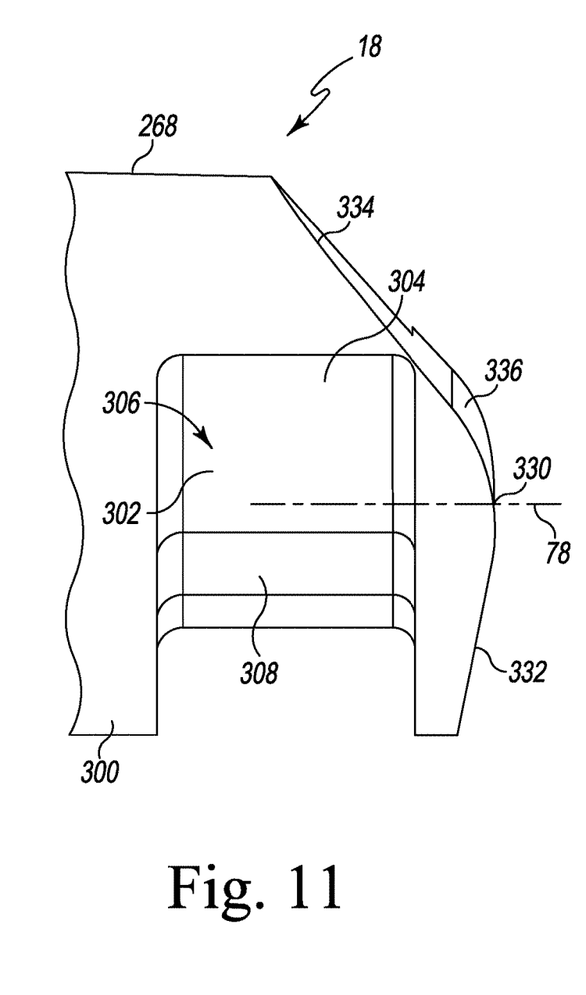
FIG. 11 is a top plan view of an end of the pin shown of the second component shown in FIG. 4.

Referring to FIG. 10, the pin 18 includes a body 268 having a rear end 270. The rear end 270 includes an end surface 272. A cavity 274 extends from an opening 276 in the end surface 272. The cavity 274 includes a bottom surface 284 and a side wall 278 extending from the bottom surface 284. The cavity 274 includes a substantially square area 280 that is sized and shaped to receive the body 256 of the raised surface 254 of the knob 20. A notch 282 extends radially outward from the area 280 and is sized and shaped to receive the flange 258 of the raised surface 254 of the knob 20. The raised surface 254 of the knob 20 is sized and shaped to be received in the cavity 274 of the pin 18 so that the pin 18 is rotated with the knob 20 when the knob 20 is rotated by a user. A bore 290 extends from an opening 292 in the raised surface 254 of the knob 20. The bore 290 is configured to receive the fastener 104 to couple the knob 20 to the pin 18.

Figure 12:
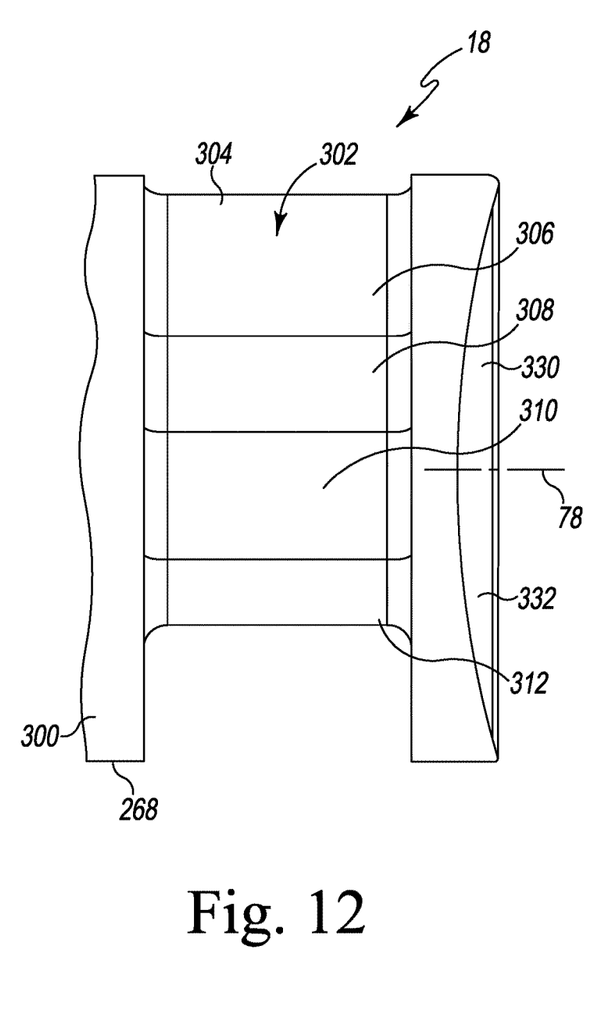
FIG. 12 is a first side elevation view of the end of the pin shown in FIG. 11.
Figure 13:
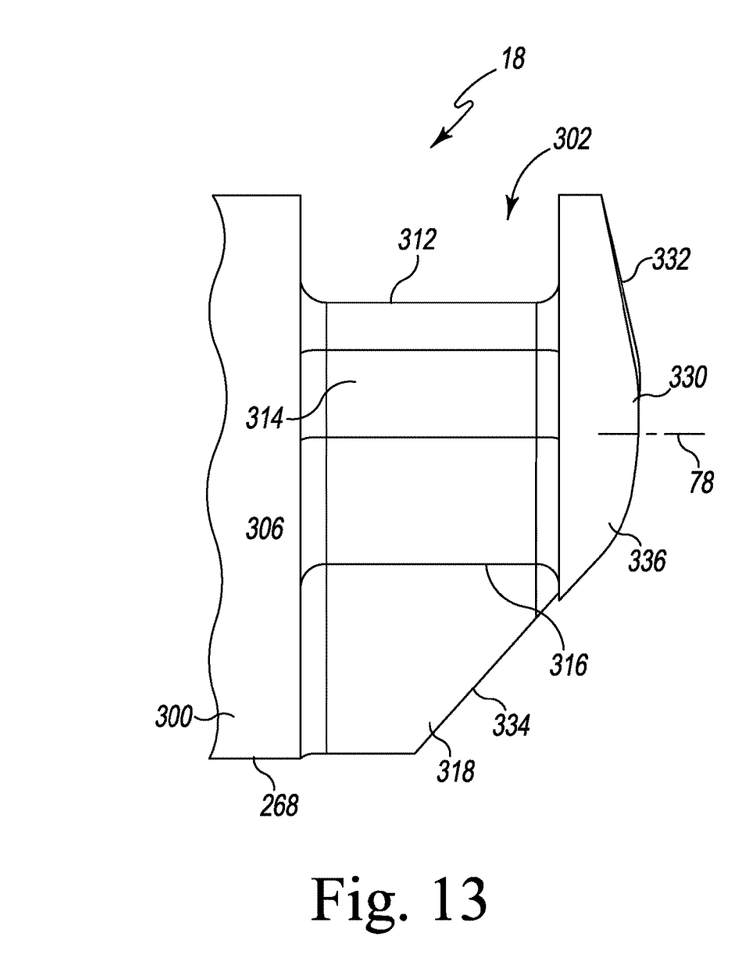
FIG. 13 is a bottom plan view of the end of the pin shown in FIG. 11.
Figure 14:
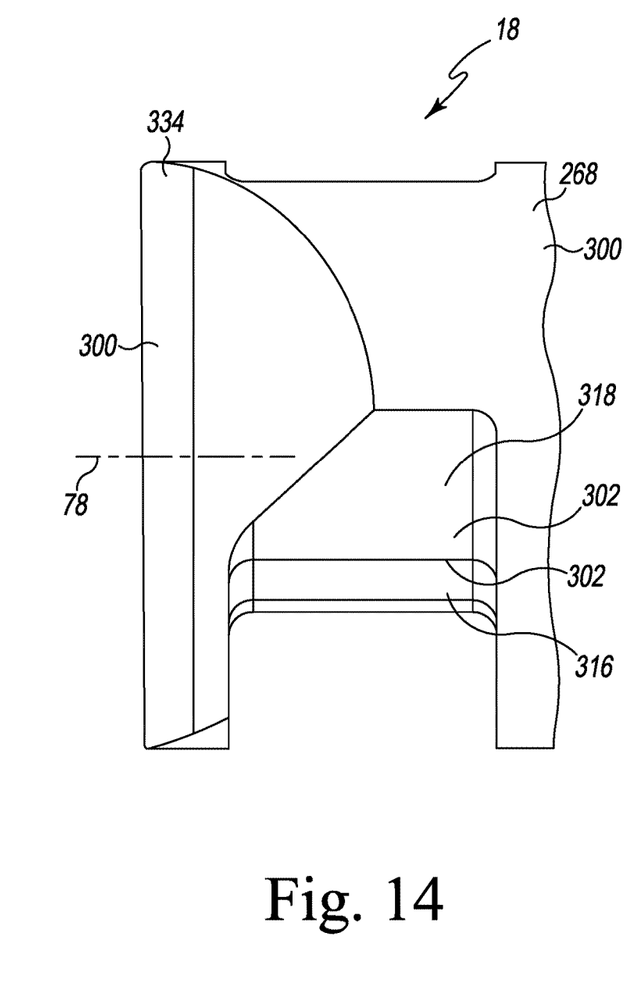
FIG. 14 is a second side elevation view of the end of the pin shown in FIG. 11.

Referring now to FIGS. 11-14, the body 268 of the pin 18 includes an outer surface 300. A notch 302 is formed in the outer surface 300 and includes bottom walls 304. The bottom walls 304 include a planar surface 306 that extends to a rounded surface 308. Moving around the pin 18, the rounded surface 308 is coupled to another rounded surface 310 by a cam surface 312, as shown in FIG. 12. Other rounded surfaces 314, 316 extend from the cam surface 312 to a planar surface 318. The planar surface 318 is substantially parallel with the planar surface 306. The planar surface 318 slopes back to the outer surface 300, as illustrated in FIG. 14. The planar surfaces 306 and 316 and the cam surface 312 are sized and shaped to be received in the notch 70 of the locking plate 16. The cam surface 312 defines a tip of the pin 18.

Referring to FIGS. 11-14, an end 330 of the pin 18 extends from the body 268. The end 330 includes an upper tapered surface 332 coupled to a lower tapered surface 334 by a rounded surface 336. Each of the upper tapered surface 332 and the lower tapered surface 334 extends at an angle relative to the longitudinal axis 78. The upper tapered surface 332 extends at a non-orthogonal angle to the lower tapered surface 334. The upper tapered surface 332 and the lower tapered surface 334 are generally planar. As described in more detail below, the lower tapered surface 334 is sized and shaped to contact and slide past the angled upper surface 64 of the locking plate 16 during operation.

Figure 15:
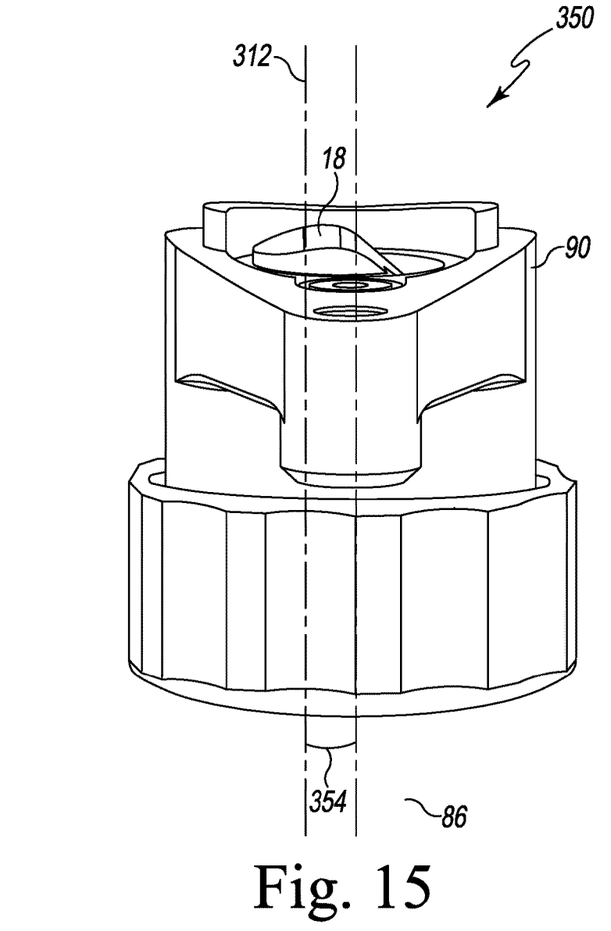
FIG. 15 is a bottom plan view of the second component shown in FIG. 1 and in an unlocked position.
Figure 16:
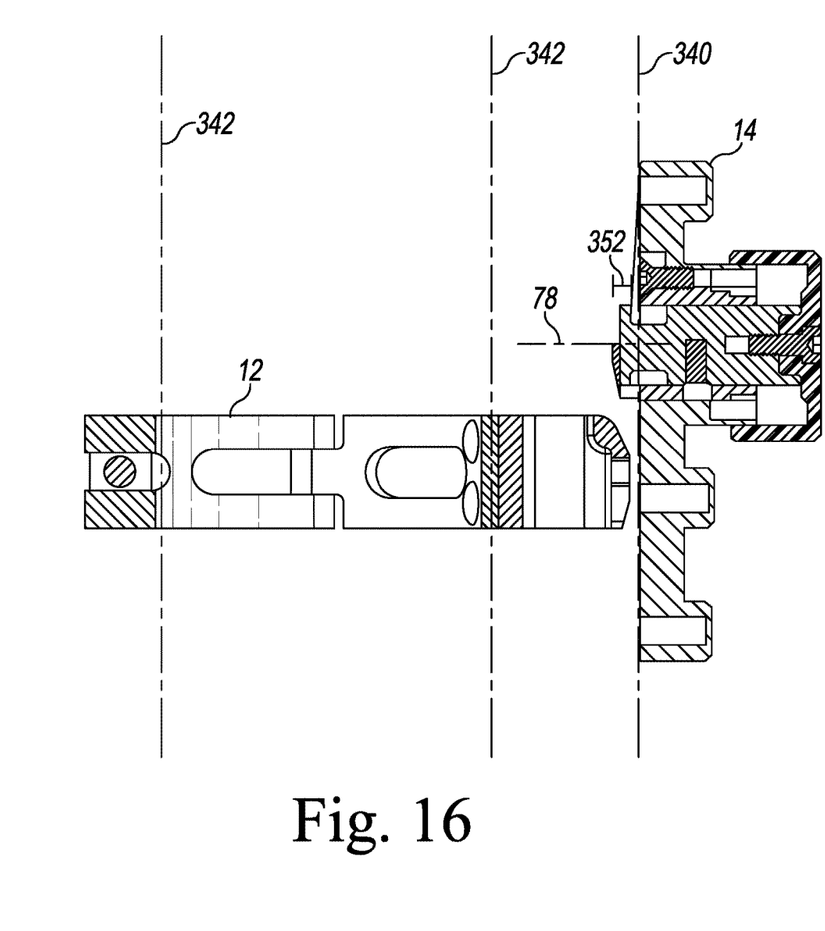
FIG. 16 is a side cross-sectional view of the first component and the second component shown in FIG. 1 with the second component in the unlocked position.

During operation, the second component 14 is coupled to a telescopic outer shaft 340 of a suspension fork, and the first component 12 is coupled to an inner shaft 342 of the suspension fork. The pin 18 is initially in an unlocked position 350, as illustrated in FIGS. 15 and 16. In the unlocked position 350, the cam surface 312 is positioned within the housing 90 a distance 352 from the longitudinal axis 86. The first distance 352 is defined along the longitudinal axis 78. The cam surface 312 is angled from the longitudinal axis 86 at an angle 354, as illustrated in FIG. 15. In the unlocked position 350, the telescopic outer shaft 340 can freely move relative to the inner shaft 342. That is, the telescopic outer shaft 340 can be compressed relative to the inner shaft 342. With the pin 18 in the unlocked positioned 350, the first component 12 freely moves past the second component 14 when a compressive force is applied to the telescopic outer shaft 340.

Figure 17:
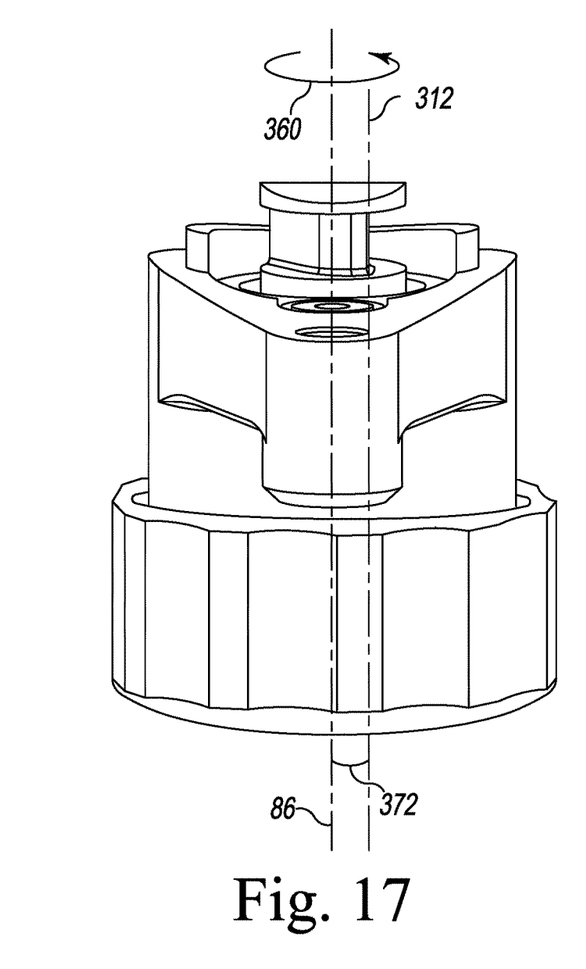
FIG. 17 is a view similar to FIG. 15 with the second component in a starting position.
Figure 18:
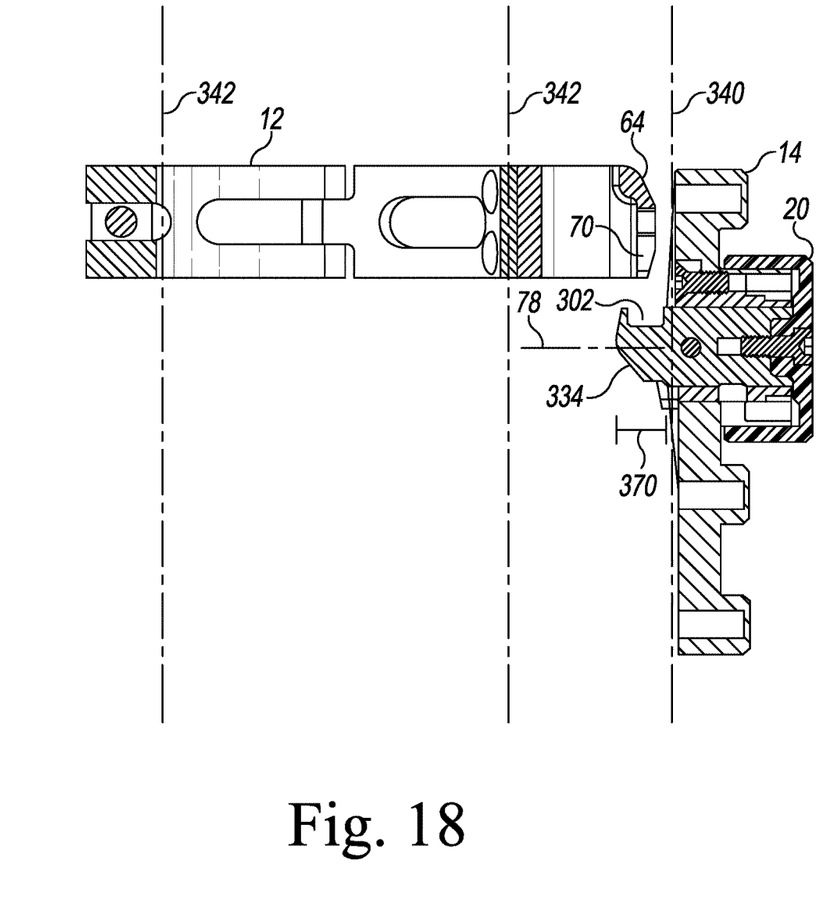
FIG. 18 is a view similar to FIG. 16 with the second component in the starting position and advanced past the first component.

To operate the assembly 10, the knob 20 is rotated by a user to rotate the pin 18 about the longitudinal axis 78 in the direction of arrow 360, shown in FIG. 17. The pin 18 is rotated to a starting position 362, as illustrated in FIGS. 17 and 18. During rotation, the guide tab 100 of the pin 18 advances along the guide slot 98 of the guide barrel 94 and into the locking mechanism 228. The pin 18 is locked in the starting position 362 when the guide tab 100 is secured within the locking mechanism 228. In the starting position 362, the cam surface 312 extends from the housing 90 to a distance 370 from the longitudinal axis 86. The distance 370 is defined along the longitudinal axis 78. The cam surface 312 is also rotated to an angle 372 relative to the longitudinal axis 86. The angle 372 is different than the angle 354.

With the pin 18 in the starting position 362, the telescopic outer shaft 340 is compressed relative to the inner shaft 342 so that the first component 12 advances past the second component 14, as illustrated in FIG. 18. As the first component 12 advances past the second component 14, the lower tapered surface 334 of the pin 18 contacts and slides along the angled upper surface 64 of the locking plate 16. When the first component 12 is advanced past the second component 14, the notch 302 of the pin 18 is aligned with the notch 70 of the locking plate 16.

Figure 19:
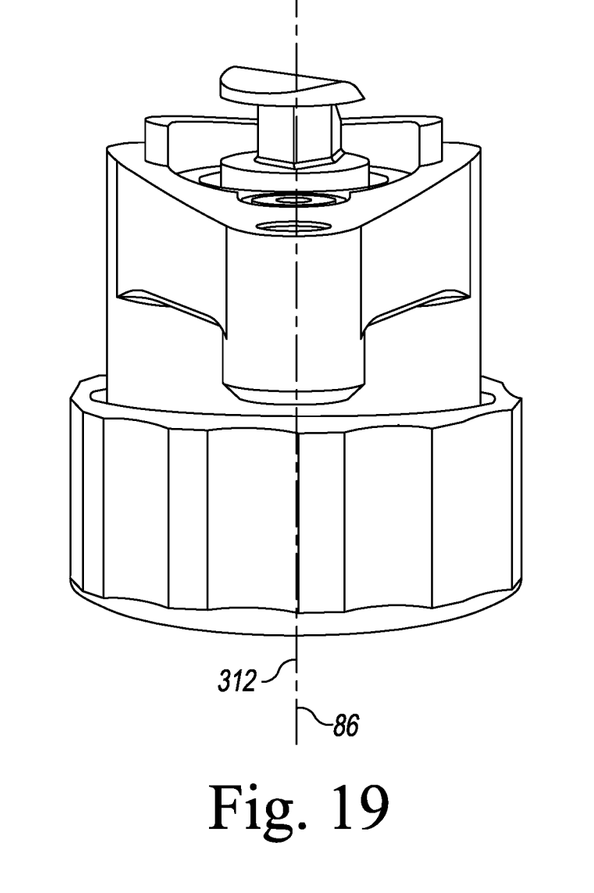
FIG. 19 is a view similar to FIG. 15 with the second component in a locked position.
Figure 20:
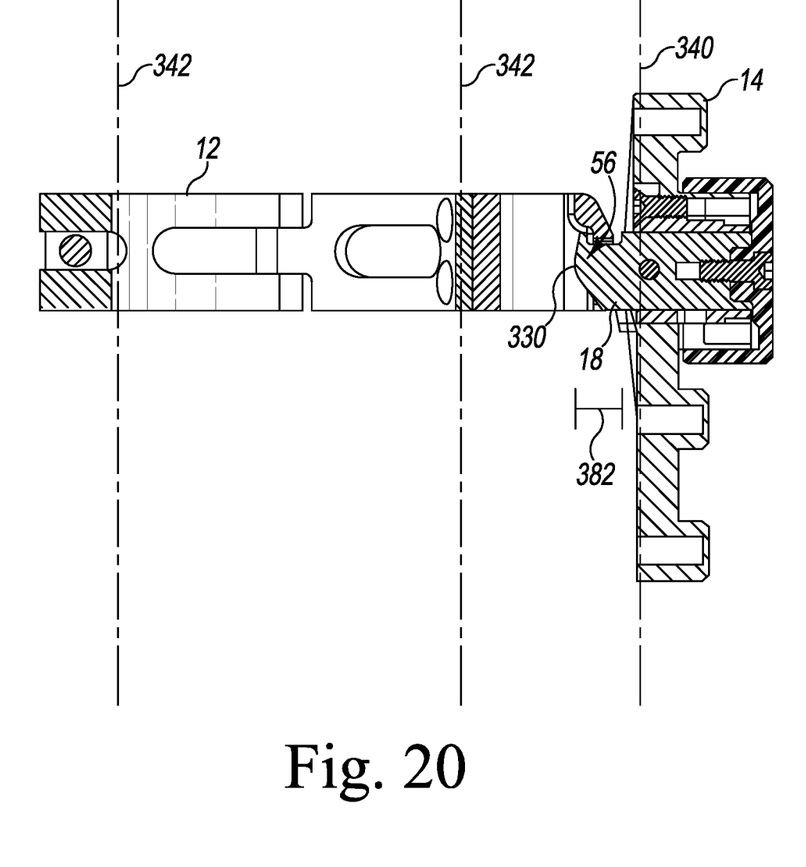
FIG. 20 is a view similar to FIG. 16 with the second component in the locked position and secured to the first component.

The compressive force on the telescopic outer shaft 340 is then released, so that the first component 12 advances toward the second component 14. The end 330 of the pin 18 advances into the opening 56 in the locking plate 16 so that the notch 302 of the pin 18 advances into the notch 70 of the locking plate 16. The cam surface 312 contacts the side wall 80 of the notch 70 and the guide tab 100 is released from the locking mechanism 228 so that the pin 18 rotates to a locked positioned 380, shown in FIGS. 19 and 20. In the locked position 380 the pin 18 is secured within the locking plate 16. The planar surfaces 306, 316 of the pin 18 are aligned with and extending parallel to the side walls 80 of the locking plate 16. The planar surfaces 306, 316 are secured against the side walls 80 to retain the pin 18 in the locked position 380. In the locked position 380, the cam surface 312 extends from the housing 90 to a distance 382 from the longitudinal axis 86. The distance 382 is defined along the longitudinal axis 78. The cam surface 312 is also aligned with the longitudinal axis 86.

A single user can operate the assembly 10 as described above to lock the telescopic outer shaft 340 in a compressed position relative to the inner shaft 342. With the telescopic outer shaft 340 compressed, the motorcycle is started. The motorcycle is prevented or limited from rotating onto the back tire when the motorcycle thrusts because of the compressed position of the telescopic outer shaft 340. As the motorcycle is operated, an additional compressive force of the telescopic outer shaft 340 causes the pin 18 to disengage from the locking plate 16. Because the guide tab 100 has been released from the locking mechanism 228, the biasing element 106 biases the pin 18 back to the unlocked position 350 so that the first component 12 can freely move relative to the second component 13, thereby allowing compression and extension of the telescopic outer shaft 340 relative to the inner shaft 342.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the devices and assemblies described herein. It will be noted that alternative embodiments of the devices and assemblies of the present disclosure may not include all of the features described yet still benefit from at least some of the advantages of such features. Those of ordinary skill in the art may readily devise their own implementations of the devices and assemblies that incorporate one or more of the features of the present invention and fall within the spirit and scope of the present disclosure as defined by the appended claims.

What is claimed is:

1. An apparatus for a vehicle comprising:
a locking plate configured to be coupled to a first shaft of a suspension rod,
a housing configured to be coupled to a second shaft of the suspension rod that moves relative to the first shaft, the housing extending along a first longitudinal axis,
a pin configured to rotate about a second longitudinal axis, wherein the pin is biased into an unlocked position, and wherein the pin is configured to engage the locking plate in a locked position, and
a locking mechanism configured to lock the pin in starting position, wherein, when the pin is released from the starting position, the pin moves into the locked position, wherein:
in the unlocked position, a tip of the pin is positioned in the housing, and
in the starting position, the tip of the pin is positioned outside of the housing.

2. The apparatus of claim 1, wherein the locked position is between the unlocked position and the starting position.

3. The apparatus of claim 1, wherein the first longitudinal axis is orthogonal to the second longitudinal axis.

4. An apparatus for a vehicle comprising:
a locking plate configured to be coupled to a first shaft of a suspension rod,
a housing configured to be coupled to a second shaft of the suspension rod that moves relative to the first shaft, the housing extending along a first longitudinal axis,
a pin configured to rotate about a second longitudinal axis, wherein the pin is biased into an unlocked position, and wherein the pin is configured to engage the locking plate in a locked position, and
a locking mechanism configured to lock the pin in starting position, wherein, when the pin is released from the starting position, the pin moves into the locked position, wherein the locking plate includes:
a first arm segment, and
a pair of second arm segments hingedly attached to the first arm segment.

5. The apparatus of claim 4, wherein the pair of second arm segments are secured together with a fastener to secure the locking plate to the first shaft of the suspension rod.

6. An apparatus for a vehicle comprising:
a locking plate configured to be coupled to a first shaft of a suspension rod,
a housing configured to be coupled to a second shaft of the suspension rod that moves relative to the first shaft, the housing extending along a first longitudinal axis,
a pin configured to rotate about a second longitudinal axis, wherein the pin is biased into an unlocked position, and wherein the pin is configured to engage the locking plate in a locked position, and
a locking mechanism configured to lock the pin in starting position, wherein, when the pin is released from the starting position, the pin moves into the locked position, wherein the pin is moved from the unlocked position to the starting position by rotating the pin about the second longitudinal axis.

7. An apparatus for a vehicle comprising:
a locking plate configured to be coupled to a first shaft of a suspension rod,
a housing configured to be coupled to a second shaft of the suspension rod that moves relative to the first shaft, the housing extending along a first longitudinal axis,
a pin configured to rotate about a second longitudinal axis, wherein the pin is biased into an unlocked position, and wherein the pin is configured to engage the locking plate in a locked position, and
a locking mechanism configured to lock the pin in starting position, wherein, when the pin is released from the starting position, the pin moves into the locked position, wherein the pin is moved from the starting position to the locked position by applying a compressive force to the suspension rod.

8. The apparatus of claim 7, wherein the compressive force is applied along the first longitudinal axis.

9. The apparatus of claim 7, wherein the pin advances past the locking plate when the compressive force is applied.

10. The apparatus of claim 9, wherein a lowered tapered surface of the pin advances along an upper tapered surface of the locking plate as the pin advances past the locking plate.

11. The apparatus of claim 10, wherein the pin engages the locking plate when the compressive force is released.

12. The apparatus of claim 11, wherein the pin is rotated to the locked position when the pin engages the locking plate.

13. The apparatus of claim 12, wherein the pin disengages from the locking plate when an additional compressive force is applied to the suspension rod.

14. The apparatus of claim 13, wherein the pin retracts to the unlocked position when the pin is disengaged from the locking plate.

15. An apparatus for a vehicle comprising:
a locking plate configured to be coupled to a first shaft of a suspension rod,
a housing configured to be coupled to a second shaft of the suspension rod that moves relative to the first shaft, the housing extending along a first longitudinal axis,
a pin configured to rotate about a second longitudinal axis, wherein the pin is biased into an unlocked position, and wherein the pin is configured to engage the locking plate in a locked position, and
a locking mechanism configured to lock the pin in starting position, wherein, when the pin is released from the starting position, the pin moves into the locked position, wherein a guide tab of the pin is locked in the locking mechanism when the pin is rotated to the starting position.

16. The apparatus of claim 15, wherein the guide tab of the pin is disengaged from the locking mechanism when the pin is engaged with the locking plate.

17. An apparatus for a vehicle comprising:
a locking plate configured to be coupled to a first shaft of a suspension rod,
a housing configured to be coupled to a second shaft of the suspension rod that moves relative to the first shaft, the housing extending along a first longitudinal axis,
a pin configured to rotate about a second longitudinal axis, wherein the pin is biased into an unlocked position, and wherein the pin is configured to engage the locking plate in a locked position, and
a locking mechanism configured to lock the pin in starting position, wherein, when the pin is released from the starting position, the pin moves into the locked position, wherein:
in the unlocked position, the pin is positioned at a first rotational angle relative to the second longitudinal axis, and
in the starting position, the pin is positioned at a second rotational angle relative to the second longitudinal axis,
wherein the first rotational angle is different than the second rotational angle.

18. An apparatus for a vehicle comprising:
a locking plate configured to be coupled to a first shaft of a suspension rod,
a housing configured to be coupled to a second shaft of the suspension rod that moves relative to the first shaft, the housing extending along a first longitudinal axis,
a pin configured to rotate about a second longitudinal axis, wherein the pin is biased into an unlocked position, and wherein the pin is configured to engage the locking plate in a locked position, and
a locking mechanism configured to lock the pin in starting position, wherein, when the pin is released from the starting position, the pin moves into the locked position, wherein a notch of the pin is secured with a notch of the locking plate in the locked position.

* * * * *